Dec. 30, 1924.
T. OLINGER
1,521,250
DAMPER CONSTRUCTION AND CLIP THEREFOR
Filed Sept. 5, 1922
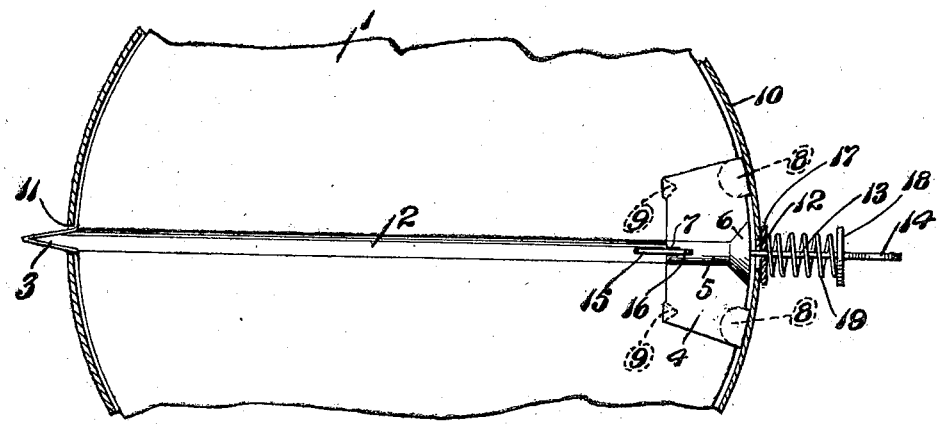
Fig.1.
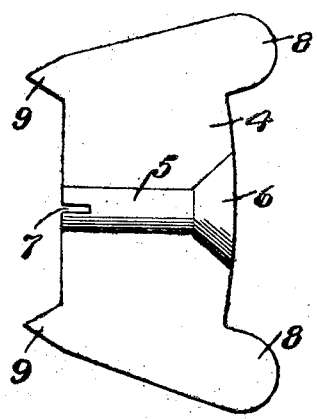
Fig.2.
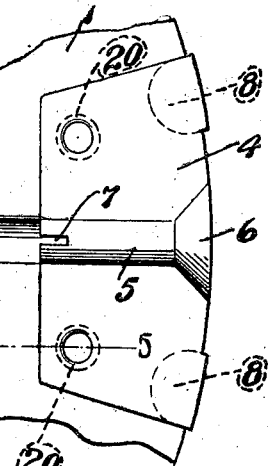
Fig.3.
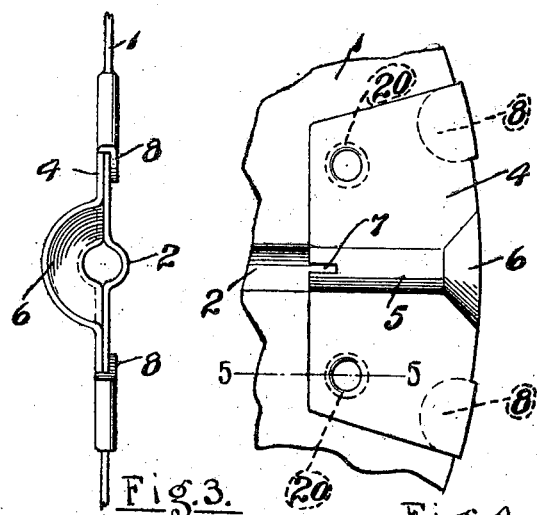
Fig.4.
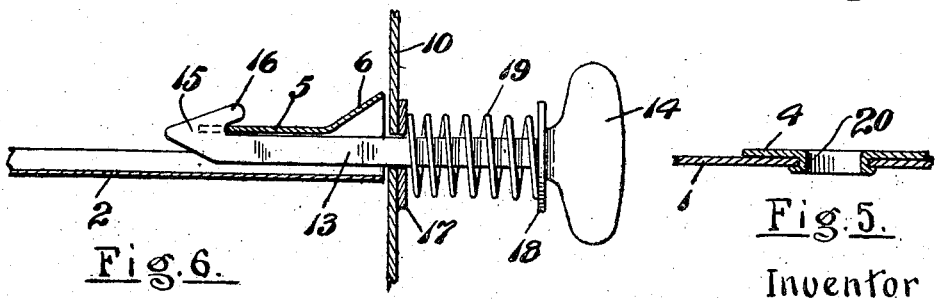
Fig.6.
Fig.5.
Inventor
Thomas Olinger
By Frank E. Liverance, Jr.
Attorney Patented Dec. 30, 1924.

1,521,250

UNITED STATES PATENT OFFICE.

THOMAS OLINGER, OF HOLLAND, MICHIGAN, ASSIGNOR, BY MESNE ASSIGNMENTS, TO FEDERAL MANUFACTURING COMPANY, OF HOLLAND, MICHIGAN, A CORPORATION OF MICHIGAN.

DAMPER CONSTRUCTION AND CLIP THEREFOR.

Application filed September 5, 1922. Serial No. 586,110.

*To all whom it may concern:*

Be it known that I, THOMAS OLINGER, a citizen of the United States of America, residing at Holland, in the county of Ottawa and State of Michigan, have invented certain new and useful Improvements in Damper Constructions and Clips Therefor; and I do hereby declare the following to be a full, clear, and exact description of the invention, such as will enable others skilled in the art to which it appertains to make and use the same.

This invention relates to a sheet metal damper construction and a sheet metal clip therefor, together with a novel and simple operating member adapted to be detachably connected therewith, the damper being particularly adapted for use in the warm air pipes of furnaces. In the present invention the construction is designed especially with reference to economy in manufacture, whereby the complete damper is made at a very low cost and can be sold at low price. It is a primary object and purpose of the invention to make a damper construction of this character, of very simple and novel construction, in which the clip attached to the disk is of novel form, made entirely from a single piece of sheet metal of small size, and the operating member is likewise of a single piece of metal, both being formed with a minimum of operations by dies in a punch press, and assembled in a simple and economical manner, at the same time producing a damper which is durable, practical and efficient in every way. Many other objects and purposes than those stated will appear as an understanding of the invention is had from the following description, taken in connection with the accompanying drawing, in which, Fig. 1 is a fragmentary transverse section through a furnace pipe, the damper being fragmentarily shown in elevation.

Fig. 2 is an elevation of one form of the clip.

Fig. 3 is a fragmentary edge view of the damper disk with the clip attached thereto.

Fig. 4 is a fragmentary elevation of the damper disk and a different form of clip connected thereto, the difference consisting in a different specific means for permanently connecting the clip to the disk, Fig. 5 is a section taken substantially on the plane of line 5—5, of Fig. 4, and Fig. 6 is a section taken longitudinally of the furnace pipe and through the disk and clip, showing the assembly of the operating member therewith, said member being shown in elevation.

Like reference characters refer to like parts in the different figures of the drawing.

The damper disk 1 is made from thin sheet metal of a size to loosely fit in a furnace pipe and it is formed with a bead 2 across the same on a diameter of the disk, the metal at one end of the bead being extended beyond the edge of the disk and brought to a point as indicated at 3.

The clip used therewith comprises a piece 4 of sheet metal of heavier gage, substantially rectangular in shape. Midway between its ends this clip is formed with a bead 5 extending the full width of the clip and enlarged and flared, as indicated at 6 at its outer end. The bead 5 at its inner end and upper side is notched for a short distance, making a narrow notch or cut 7, as shown. At the outer corners of the clip, outwardly projecting ears 8 are made and at the inner corners, pointed inwardly projecting tangs 9 are cut, the ears being adapted to be turned around the edge of the disk 1 and clinched against the opposite side in connecting the clip to the disk, and the tangs turned at right angles and passed through the disk and likewise clinched against the opposite side, as shown in Figs. 1 and 3. When thus permanently secured in place, the bead 5 is located directly over the bead 2. Said beads project in opposite directions from the respective disk and clip whereby when the disk and clip are connected together a substantially cylindrical opening is made between them by the grooves of the beads, as is evident.

This damper with attached clip is to be placed in a furnace pipe, as 10, the pointed projection 3 passing through an opening 11 in a side of the pipe, and the outer flared end 6 of bead 5 coming into conjunction with a diametrically opposite opening 12 in said furnace pipe. Through the opening 12 and through the space between the disk and clip the operating member for the damper is inserted. This operating member comprises a bar 13 of flat metal, at its outer end formed with a widened head 14 for engagement by the fingers in turning the damper. At its inner end the bar is somewhat widened and pointed, as indicated at 15, and formed with a hook 16 at one side as shown. Two washers 17 and 18 with a coiled spring 19 between them are placed on the bar 13 and when the end of the bar is inserted through between the clip and disk, the washer 17 comes against the pipe and the washer 18 bears against the head 14. This latter washer may be dispensed with if desired. In any case, the spring 19 is compressed and after the pointed end 15 and hook 16 has passed by the clip, the operating member may be turned so as to bring the hook in alignment with the notch 7, the spring retracting the operating member and seating the hook in the notch with the overhanging part thereof located over the adjacent portion of the bead 5. This makes a sure but detachable assembly, one easy to make and easy to detach whenever the damper is to be removed.

In Figs. 4 and 5 a slightly different construction of the clip is shown, the tangs 9 being eliminated and eye portions 20 struck from the body of the clip at each side of the bead 5 to pass through openings in the disk 1, being riveted over for a permanent connection. This construction is preferred as using less stock and making a better connection.

This damper construction is simple, economically made from sheet metal, quickly and easily assembled, is practical and serviceable in all respects. The invention is defined in the appended claims and I consider all forms of structure coming within their scope as comprehended by the invention.

I claim:

1. A damper clip comprising a piece of sheet metal substantially rectangular in shape and adapted to be located over a damper disk at one side thereof, ears at the outer corners of the clip adapted to be bent around the edge of the disk and against the opposite side thereof, said clip being formed with an upraised bead from its inner to its outer side and said bead having a notch cut therein in its upper side and at its inner end, and securing devices adjacent the inner corners of the clip adapted to pass through the damper disk and be clinched against the opposite side thereof.

2. A damper clip comprising a piece of sheet metal substantially rectangular in shape and adapted to be located over a damper disk at one side thereof and permanently secured thereto, said clip being formed with an upraised bead from its inner to its outer side edges and said bead having a notch cut therein at its inner end and in the upper side thereof.

3. In a damper, a disk having a bead formed therein on a diameter of the disk, a clip attached at one side of the disk over the bead therein, said clip being formed with a similar oppositely projecting bead, means securing the clip to the disk, and a short flat metal operating member adapted to be inserted between the disk and clip, at its inner end being formed with a hook, said bead on the clip at its inner end having a notch cut therein to receive said hook thereby connecting the clip and attached disk to the operating member, substantially as described.

4. A damper operating member comprising a flat piece of metal formed as a relatively short flat bar, at its outer end having a widened finger engaging portion, and at its inner end formed with a backwardly extending hook, substantially as and for the purposes described.

5. In a damper, a disk of thin sheet metal formed with a bead on a diameter thereof, a clip of thicker sheet metal located at one side of and over the disk, said clip being formed with a bead directly over the bead in the disk and projecting in the opposite direction therefrom, an operating member formed as a relatively short flat bar, at its outer end having a widened finger engaging portion and at its inner end formed with a backwardly extending hook, said member being passed through the space between said beads on the disk and clip, the hook seating in the notch in the bead on the clip for detachably connecting the same together, and means permanently securing the clip to the disk.

In testimony whereof I affix my signature.

THOMAS OLINGER.